May 20, 1924.
H. AUSTIN
CONDENSER TESTER
Filed Oct. 29, 1921
1,494,330
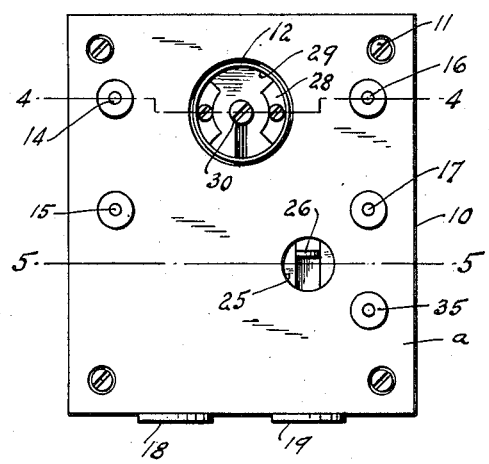
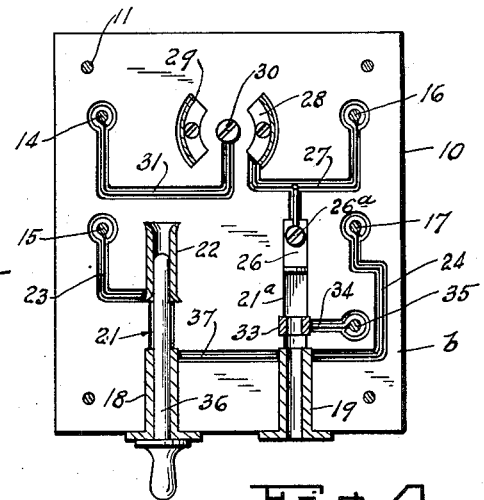
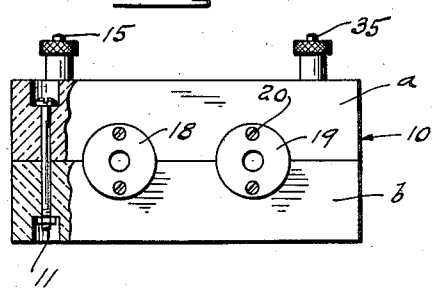
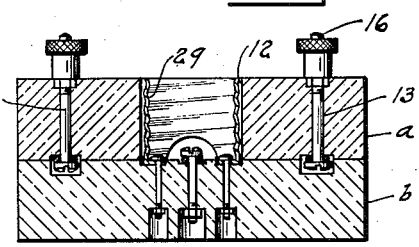
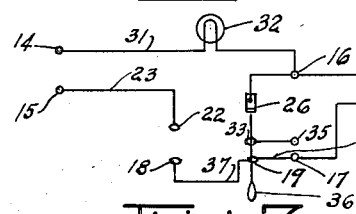
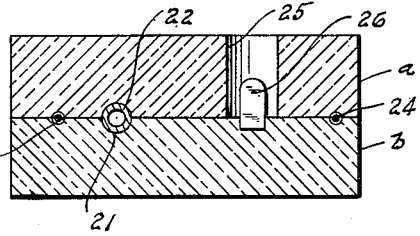
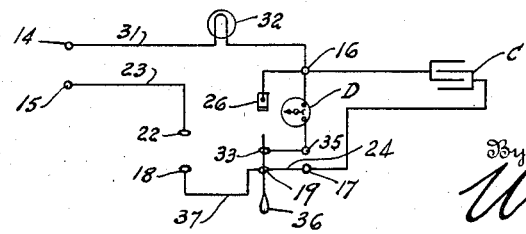
Inventor
Howard Austin
By Watson E. Coleman Attorney Patented May 20, 1924.

1,494,330

UNITED STATES PATENT OFFICE.

HOWARD AUSTIN, OF WASHINGTON, DISTRICT OF COLUMBIA.

CONDENSER TESTER.

Application filed October 29, 1921. Serial No. 511,303.

*To all whom it may concern:*

Be it known that I, HOWARD AUSTIN, a citizen of the United States, residing at Washington, in the District of Columbia, have invented certain new and useful Improvements in Condenser Testers, of which the following is a specification, reference being had to the accompanying drawings.

This invention relates to means for testing electrical condensers.

Condensers have heretofore been tested by measuring their capacity in a laboratory, and the primary object of my invention is to provide a very simple and effective means for testing condensers of such construction that a person having no knowledge of electricity can determine whether or not a condenser is defective to the extent that it is unfit for automobile ignition work.

A further object is to provide a construction of this character which will indicate by the character of its spark the effectiveness of the condenser, and which will also indicate whether or not the insulation of the condenser is sufficient to prevent its losing its charge.

A still further object is to provide a device of this character which is very simple, is cheaply made, is readily handled, and is of such character that a galvanometer may be used in testing the condenser if desired, and further to provide a device of this kind which may be operated either with direct or alternating current.

My invention is illustrated in the accompanying drawings, wherein:—

Figure 1 is a face view of a condenser tester constructed in accordance with my invention;

Figure 2 is a face view of the lower section of the tester;

Figure 3 is a front elevation of the tester partially broken away;

Figure 4 is a section on the line 4—4 of Figure 1;

Figure 5 is a section on the line 5—5 of Figure 1;

Figure 6 is a diagrammatic view showing the tester in use and in its condenser discharging position;

Figure 7 is a like view to Figure 2, but showing the manner in which a galvanometer can be connected in circuit with the condenser;

Referring to these drawings, it will be seen that the tester consists of a body 10 of any suitable non-conducting material, as for instance, wood, bakelite, hard fiber or the like. This body 10 is preferably made in two sections $a$ and $b$ held together by bolts 11, as illustrated. The upper section $a$ is formed adjacent one end with a vertically disposed aperture 12 and with vertical apertures 13 for the passage of the binding screws 14, 15, 16 and 17. The two sections of the body at the front of the body are formed with metallic sleeves 18 and 19, each of these sleeves being flanged and held in place by screws 20 passing through the flange of the sleeve, these sleeves entering semi-circular, confronting grooves 21, 21ᵃ formed in the confronting faces of the sections $a$ and $b$.

Disposed in spaced relation to the sleeve 18 is a sleeve 22 which is preferably expanded at its ends, that is gradually contracted toward the middle of the sleeve, this expansion of the sleeve holding it firmly in place within either the upper or the lower section. This sleeve 22 is disposed in axial alignment with the sleeve 18 at the inner end of the groove 21. The sleeve 22 is connected by a conducting wire 23 to the binding post 15. The sleeve 19 is connected by a conducting wire 24 to the binding post 17. In alignment with the sleeve 19 there is formed in the upper section $a$ the downwardly extending recess or passage 25 which intersects the passage 21ᵃ within which the sleeve 19 is located. Disposed at the end of this passage is a contact 26 supporting a fixed spark gap terminal and which is angular in form to provide an upwardly extending tongue, this terminal being attached by a screw 26ᵃ to the base section $b$ and the upwardly extending tongue being disposed immediately opposite the sleeve 19. This terminal 26 is connected by a wire 27 to the binding post 16, and this wire 27 is connected in turn by a conductor to one of the contacts 28 of an electric light socket 29 disposed in the recess 12. The central electrode 30 of this electric light socket is connected by a conductor 31 to the binding post 14. This is illustrated diagrammatically in Figure 2. An ordinary electric lamp, shown diagrammatically in Figure 7 and designated 32, is normally disposed within the socket 29.

Preferably there is disposed in the passage 21ᵃ between the inner end of the sleeve 19 and the terminal 26 a sleeve 33 which is connected by a conductor 34 to a binding post 35 upon the upper face of the section a.

Coacting with the sleeves 18 and 19 and capable of being forced thereinto is a metallic plug 36 which snugly fits the interior of the sleeve 18 or sleeve 19 and snugly fits the sleeve 22 and will also snugly fit the relatively short expanded sleeve 33.

In the use of this device, the condenser C, which is shown diagrammatically in Figure 6, has its positive and negative electrodes connected to the binding posts 16 and 17 respectively, while the binding posts 14 and 15 are connected to line wires B extending from a source of current. The sleeves 18 and 19 are, of course, to be connected by a conductor 37.

If now the plug 36 be inserted in the sleeve 18 and into the sleeve 22, a circuit will be formed including one of the line wires, the sleeve 22, sleeve 18, wire 37, sleeve 19, binding post 17, the condenser, binding post 16, the lamp 32, and back to the binding post 14 and so to the other line wire and thus the condenser may be charged. After the condenser is charged, the plug 36 is pulled out of the sleeve 18 and pushed into sleeve 19 (see Fig. 6). As the extremity of the metallic plug 36 approximates the spark gap terminal 26, a spark gap will be formed between the extremity of the plug 36 and the terminal 26 and a spark will jump across this gap, the circuit being completed through the condenser, binding post 16, wire 27 to the terminal 26, across the gap to the extremity of the plug 36, through the plug to the sleeve 19, and thence by wire 24 to the binding post 17 and the condenser, thus completing the circuit through the condenser. This circuit is broken at the spark gap. By observing the character of the spark at the spark gap, the condition of the condenser may be readily determined, a condenser having an effectiveness of 100% giving a full and thoroughly good spark, while a condenser which is defective will only give a relatively poor spark. After a slight experience the operator by looking down into the opening 25 and observing the spark may readily determine as to whether the condenser is operating with its full effectiveness or not.

If it is desired to use a galvanometer, instead of determining the effectiveness of the condenser by the character of the spark in the gap, then the galvanometer D is connected between the binding post 35 and binding post 16, and then as the plug is inserted and comes in contact with the sleeve 33, a circuit will be formed to include the galvanometer and the condenser, and the galvanometer will be deflected in the usual manner.

It is to be noted that the plug 36 acts, generally speaking, as a switch whereby the circuit may be completed either through the line wires and the condenser, cutting out the spark terminal 26, or the circuit may be completed through the spark terminal 26, cutting out the line wires.

My reason for using a plug, however, instead of a switch arm shiftable to connect the member 18 with the member 22 or the member 19 with the member 26 is, in the first place, that the removal of the plug from the sleeve 18 and its reinsertion in the sleeve 19 takes a certain length of time and cannot be done very quickly. In other words, it will take a matter of five seconds to remove the plug from its fully inserted position in the sleeve 18 and reinsert it into the sleeve 19 and approximate the point of the plug to the contact 26, and this lapse of time gives a chance for the condenser to discharge if its insulation is not perfect and thus this testing device will show whether or not the insulation be perfect. Of course, a pivoted switch might be held in a position remote from the contact 26 any desired length of time and would give the same indication, but on the other hand there is a possibility of the switch being quickly thrown, in which case there would not be a sufficient lapse of time to permit the discharge of the condenser in case the insulation was faulty.

Another reason for using the plug 36 is that the plug may be inserted gradually into the socket or sleeve 19 and while the eye of the operator looks down into the opening 25 the plug is advanced so as to approximate the terminal 26 and then the spark will jump and this spark will be plainly visible for the reason that the spark occurs in the relatively dark recess 25 so that the spark and its character are readily observable. If a switch was located upon the outer face of the body, it is obvious that the spark would not be as readily obserable. Again this construction using the plug 36 is preferable because it is simple, there is nothing liable to get out of order or become broken, which is the case if a pivoted switch arm be used. The purpose of the lamp socket 29 is to permit an electric lamp to be disposed within the circuit so as to provide sufficient resistance to prevent burning out or prevent blowing out of the fuse and this resistance in the circuit offers protection against damage by short-circuiting, as in case of short-circuit the lamp will burn. In place of the resistance formed by the filament of the lamp, a fuse of small capacity could be used between the line binding post and the condenser. The sleeves 22 and 33 are expanded at the ends so that they will bite into the wood or fiber of the body and also permit the ready insertion of the plug 26 and close contact with this plug. It will be understood that the binding posts are of conventional design with screws extending through the top block with countersunk heads. Obviously I do not wish to be limited to the exact construction shown, as this might be modified in many ways without departing from the spirit of the invention.

Of course, in place of the galvanometer a telephone receiver or other current detecting device might be used for the purpose of indicating the discharge and by sound the quality of the discharge, and when using either the galvanometer or the telephone receiver for the purpose of testing the condenser two or three dry cells can be used to furnish current. When using alternating current, if the test be made when the phase is at zero, there will be no action, but by making the test two or three times the average will indicate the quality of the spark in exactly the same manner as if direct current were used.

It will be obvious that the device is very compact, simple, has no parts which may get out of order, and that it may be readily connected to the condenser and to the line wires.

I claim:—

1. A condenser tester comprising an insulated body having means whereby it may be simultaneously connected to a pair of charging wires and to the terminals of a condenser, a fixed spark gap terminal connected to one terminal of the condenser, and a metallic plug shiftable into a position to connect both of the charging wires in circuit with the condenser terminals or shiftable to a position to connect with one of the condenser terminals and to approximate the fixed spark gap terminal to thereby cause a spark to jump a gap to the said gap terminal.

2. A condenser tester comprising an insulated body having a pair of line wire binding posts adapted to be connected to line wires and a pair of condenser binding posts adapted to be connected to the terminals of a condenser, one of said condenser binding posts being electrically connected to one of said line wire binding posts and the other line wire binding post being electrically connected in a normally open circuit with the other condenser binding post, a contact member disposed in said circuit between the last named condenser binding post and the last named line wire binding post, a spark terminal electrically connected to the first named condenser binding post, and a metallic member adapted to be disposed to close the circuit from the second named line wire binding post to the condenser and thereby close the circuit through the condenser and the line wires or disposed in electrical engagement with the contact and approximating the spark gap terminal to cause a spark to jump across the gap between the spark gap terminal and said metallic member.

3. A condenser tester comprising an insulated body having a pair of line wire binding posts adapted to be connected to line wires, a pair of condenser binding posts adapted to be connected to the terminals of a condenser, a metallic connection between one of the condenser binding posts and one of the line wire binding posts, a spark gap terminal connected to the said condenser post, a metallic sleeve spaced from but in line with the spark gap terminal and electrically connected to the other binding post of the condenser, spaced metallic sleeves, one electrically connected to the first named sleeve and the other connected to the other of the line wire binding posts, and a metallic plug adapted to be inserted through the second named sleeves to thereby electrically connect said second named sleeves or through the first named sleeve and into approximate electrical engagement with said spark gap terminal to form a spark gap.

4. A condenser tester comprising an insulated body having a pair of line wire binding posts adapted to be connected to line wires, a pair of condenser binding posts adapted to be connected to the terminals of a condenser, a metallic connection between one of the condenser binding posts and one of the line wire binding posts, a spark gap terminal connected to the said condenser post, a metallic sleeve spaced from but in line with the spark gap terminal and electrically connected to the other binding post of the condenser, spaced metallic sleeves, one connected to the first named sleeve and the other connected to the one of the line wire binding posts, a metallic plug adapted to be inserted through the second named sleeves to thereby electrically connect said second named sleeves or through the first named sleeve and into approximate electrical engagement with said spark gap terminal to form a spark gap, and a resistance disposed in the line between the first named condenser binding post and one of the line binding posts.

5. A condenser tester comprising an insulated body having a pair of line wire binding posts adapted to be connected to line wires, a pair of condenser binding posts adapted to be connected to the terminals of the condenser, a metallic connection between one of the condenser binding posts and one of the line wire binding posts and including an incandescent lamp socket, a spark gap terminal connected to the said condenser post, a metallic sleeve spaced from but in line with the contact member and electrically connected to the other binding post of the condenser, spaced metallic sleeves, one electrically connected to the first named sleeve and the other connected to the other of the line binding posts and a metallic plug adapted to be inserted through the second named sleeves to thereby electrically connect said second named sleeves or through the first named sleeve and into approximate electrical engagement with said spark gap terminal to form a spark gap.

6. A condenser tester comprising a body of insulated material formed in two confronting sections, a pair of line wire binding posts carried by one of said sections and adapted to be connected to line wires, a pair of condenser binding posts carried upon the uppermost section and adapted to be connected to the terminals of a condenser, means mounted on the body whereby the condenser may be connected in circuit with the line wires to receive a charge, a spark gap including a sparking terminal, and means whereby the condenser may be caused to discharge through said spark gap.

7. A condenser tester comprising a body of insulating material formed in two confronting sections, a pair of line wire binding posts carried by one of said sections and adapted to be connected to line wires, a pair of condenser binding posts carried upon the uppermost section and adapted to be connected to the terminals of a condenser, means mounted on the body whereby the condenser may be connected in circuit with the line wires to receive a charge, a spark gap including a sparking terminal, and means whereby the condenser may be caused to discharge through said spark gap, the body having a recess, the other sparking terminal of the body being located at the end of said recess.

8. A condenser tester comprising an insulated body, a pair of line wire binding posts mounted on the body for connection to line wires, a pair of condenser binding posts on the body for connection to the terminals of a condenser, a member constituting one terminal of a spark gap, means for connecting the terminals of the condenser in circuit with the line wires to thereby charge the condenser, and means for connecting the condenser in circuit with said spark gap terminal to form a spark gap across which to discharge the condenser.

9. A condenser tester including an insulated body having a line wire binding post adapted to be connected to a line wire and a condenser binding post adapted to be connected to one of the terminals of the condenser, said binding posts being electrically connected and said electrical connection including a resistance member, a second line wire binding post adapted to be connected to a line wire, a metallic sleeve to which the second line wire binding post is connected, a metallic sleeve spaced from the first named sleeve, a spark gap terminal connected to one of the condenser binding posts, a sleeve opposite the terminal, a second condenser binding post electrically connected to said last named sleeve, said last named sleeve being electrically connected to the second named sleeve, and a metallic plug adapted to be inserted through the first and second named sleeves to electrically engage the same or inserted through the third named sleeve into approximate engagement with the terminal to form a spark gap from the extremity of the plug to said terminal.

10. A condenser tester comprising an insulated body having a line wire binding post adapted to be connected to a line wire and a condenser binding post adapted to be connected to one of the terminals of a condenser, said binding posts being electrically connected and said connection including a resistance member, a second line wire binding post, a metallic sleeve to which the second named line wire binding post is connected, a metallic sleeve spaced from the first named sleeve, a spark gap terminal connected to the said condenser binding post, a sleeve opposite said gap terminal and spaced therefrom, a second condenser binding post electrically connected to said last named sleeve, said last named sleeve being electrically connected to the second named sleeve, and a metallic plug adapted to be inserted through the first and second named sleeves to electrically connect the same or inserted through the third named sleeve into approximate engagement with the spark gap terminal to form a spark gap, a sleeve disposed between the terminal and the third named sleeve and spaced therefrom, and a binding post connected to said last named sleeve whereby the tester may be connected to a current detecting device.

In testimony whereof I hereunto affix my signature.

HOWARD AUSTIN.